United States Patent
Cull

(10) Patent No.: US 6,874,946 B2
(45) Date of Patent: Apr. 5, 2005

(54) HYBRID FIBER OPTIC AND POWER CONNECTOR

(75) Inventor: Bryan D. Cull, Allen, TX (US)

(73) Assignee: Fiber Sytems International, Allen, TX (US)

(*) Notice: Subject to any disclaimer, the term of this patent is extended or adjusted under 35 U.S.C. 154(b) by 0 days.

(21) Appl. No.: 10/783,509

(22) Filed: Feb. 20, 2004

(65) Prior Publication Data
US 2004/0161203 A1 Aug. 19, 2004

Related U.S. Application Data

(63) Continuation of application No. 10/078,166, filed on Feb. 19, 2002, now Pat. No. 6,719,461.

(51) Int. Cl.[7] ............................................. G02B 6/38
(52) U.S. Cl. ........................... 385/71; 385/75; 439/577
(58) Field of Search ............................ 385/71, 75, 53, 385/69, 94, 101; 439/577, 589, 281

(56) References Cited

U.S. PATENT DOCUMENTS

| | | | |
|---|---|---|---|
| 2,285,510 A | | 6/1942 | Stanley |
| 4,140,366 A | | 2/1979 | Makuch et al. |
| 4,258,977 A | | 3/1981 | Lukas et al. |
| 4,493,529 A | | 1/1985 | Doty |
| 4,496,213 A | * | 1/1985 | Borsuk ........................ 385/75 |
| 4,595,839 A | | 6/1986 | Braun et al. |
| 4,812,007 A | | 3/1989 | Lukas |
| 4,877,303 A | | 10/1989 | Caldwell et al. |
| 4,878,730 A | | 11/1989 | Wall |
| 5,064,268 A | | 11/1991 | Morency et al. |
| 5,280,556 A | | 1/1994 | Jones |
| 5,283,848 A | | 2/1994 | Abendschein et al. |
| 5,394,494 A | | 2/1995 | Jennings et al. |
| 5,515,466 A | | 5/1996 | Lee |
| 5,590,229 A | | 12/1996 | Goldman et al. |
| 5,608,828 A | | 3/1997 | Coutts et al. |
| 5,796,896 A | | 8/1998 | Lee |
| D412,312 S | | 7/1999 | Myers |
| 5,980,317 A | * | 11/1999 | McNeel ...................... 439/589 |
| D424,020 S | | 5/2000 | Fisher |
| 6,068,410 A | | 5/2000 | Giebel et al. |
| 6,081,647 A | | 6/2000 | Roth et al. |
| 6,179,481 B1 | | 1/2001 | Sung |
| 6,206,579 B1 | | 3/2001 | Selfridge et al. |
| 6,234,683 B1 | | 5/2001 | Waldron et al. |
| 6,305,849 B1 | * | 10/2001 | Roehrs et al. ................ 385/59 |
| 6,357,929 B1 | | 3/2002 | Roehrs et al. |
| 6,371,660 B1 | | 4/2002 | Roehrs et al. |
| 6,485,191 B1 | | 11/2002 | Sato |

FOREIGN PATENT DOCUMENTS

EP 0166 636 A1 1/1986

OTHER PUBLICATIONS

Derwent–Abstract for EP 0166 636 A1 EPC Application— EPC (cited above).

esp@cenet database—Abstract and two drawing sheets for EP 0166 636 A1—EPC (cited above).

* cited by examiner

*Primary Examiner*—Hae Moon Hyeon
(74) *Attorney, Agent, or Firm*—Howison & Arnott, L.L.P.

(57) ABSTRACT

A fiber optic connector for mounting to a cable having a plurality of optical fibers and connecting the optical fibers to mating optical fibers using termini. The connector comprises a housing defining an exterior and having a rear portion to which the cable is secured and through which the plurality of optical fibers enter. A support member having a shank which is engaged with a retainer ring and which is disposed within the housing extends between the rear portion of the housing and a forward portion of the housing with a gap disposed between the housing and the shank through which the optical fibers extend. A recess is disposed in the forward portion of the housing and has an interiorly disposed periphery which defines a recess profile. The recess profile has inner portions which receive the termini of the optical fibers.

9 Claims, 6 Drawing Sheets

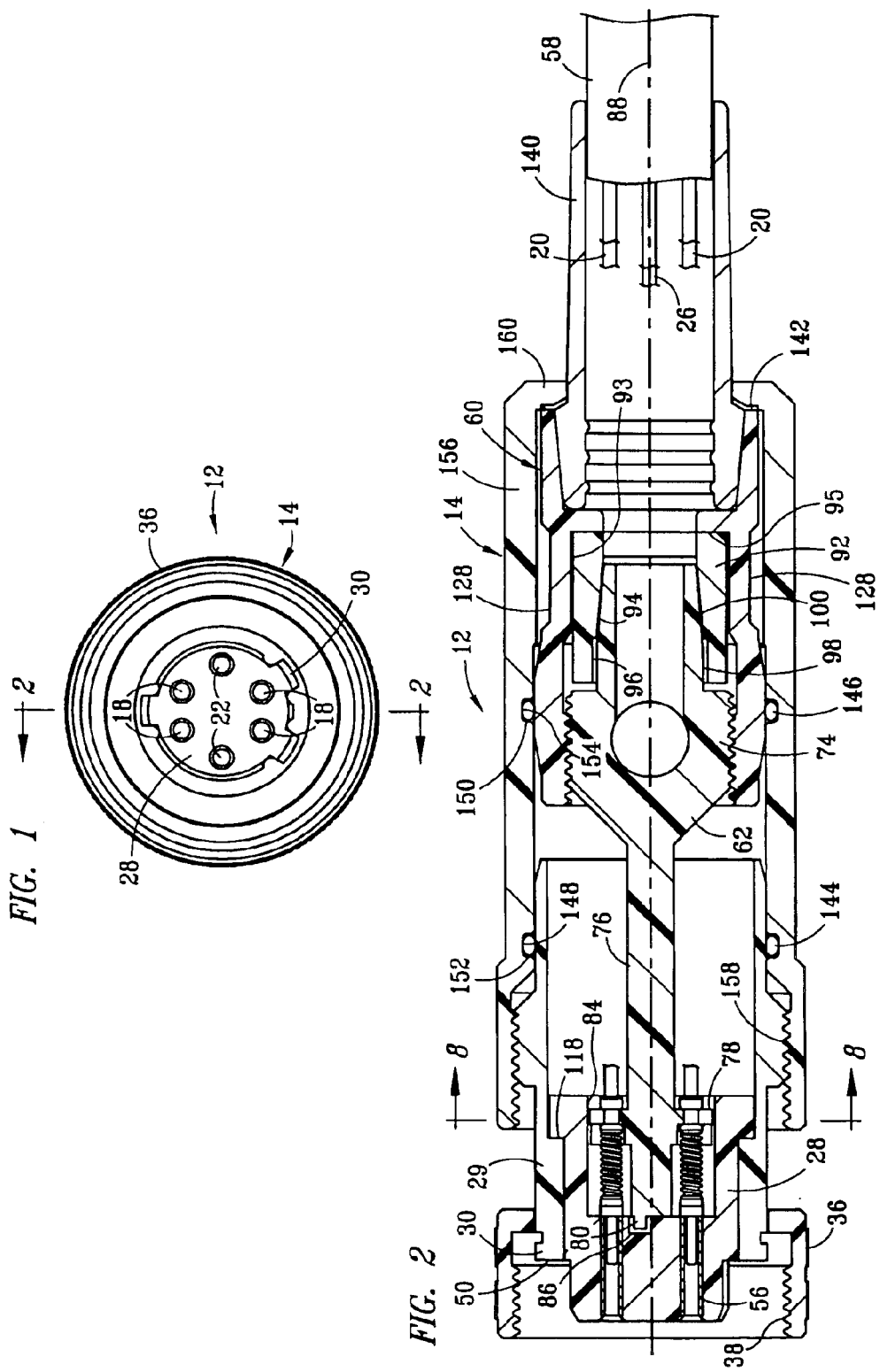

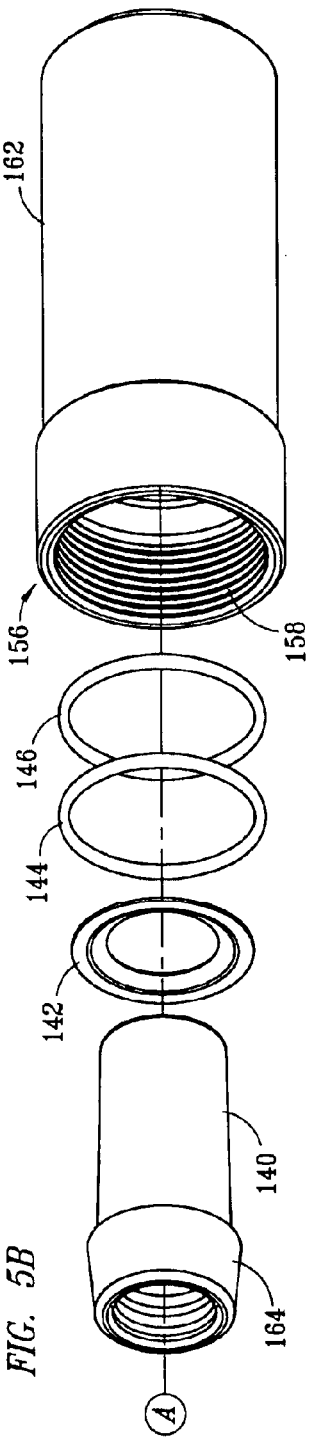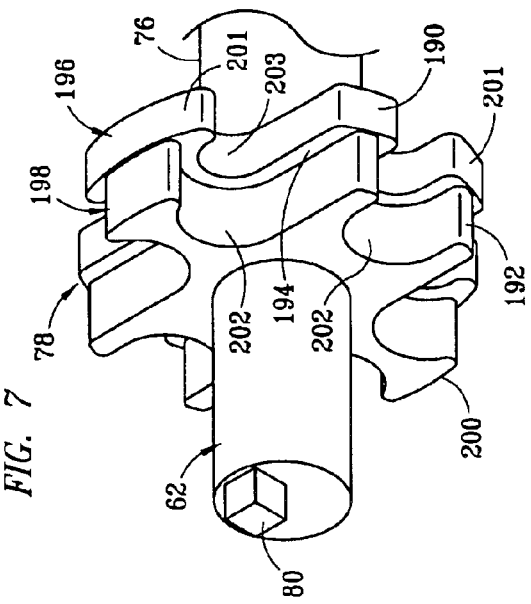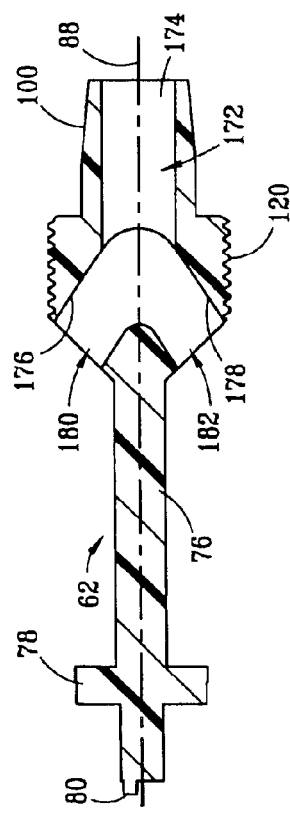

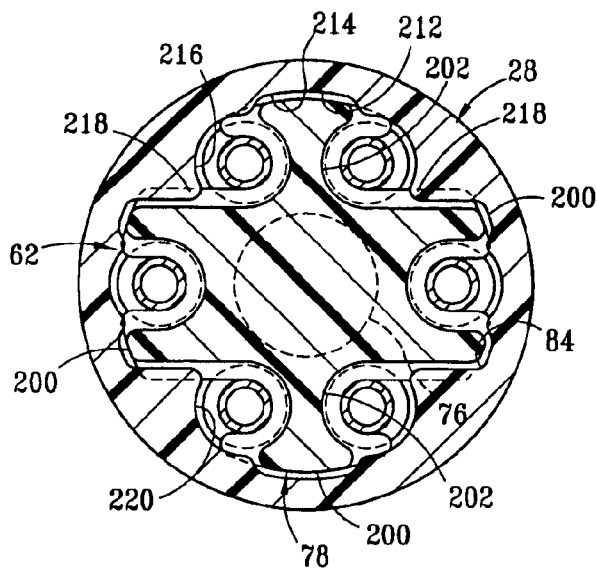
FIG. 8
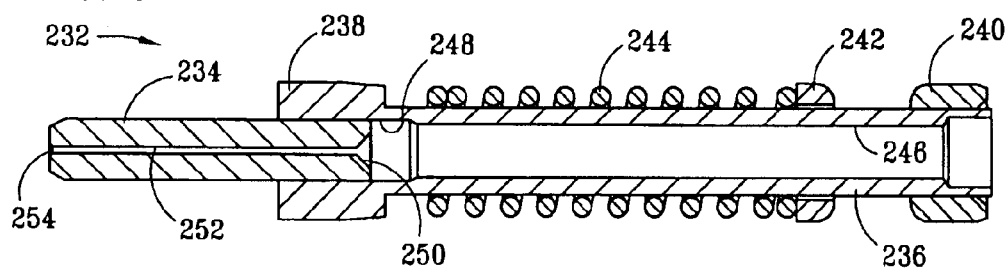
FIG. 9
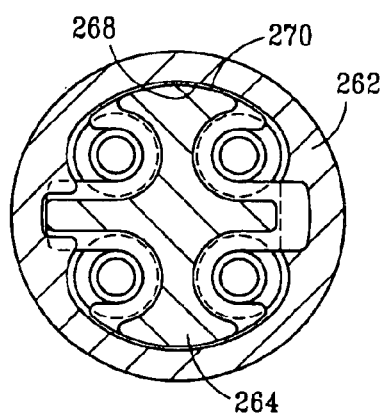
FIG. 10
FIG. 11

HYBRID FIBER OPTIC AND POWER CONNECTOR

CROSS-REFERENCE TO RELATED APPLICATIONS

This application is a Continuation of U.S. patent application Ser. No. 10/078,166 filed Feb. 19, 2002 now U.S. Pat. No. 6,719,461.

TECHNICAL FIELD OF THE INVENTION

The present invention relates in general to fiber optic connectors and electrical power cable connectors, and, in particular, to a hybrid fiber optic and power cable connector for simultaneously connecting mating pairs of optical fibers and mating pairs of electrical power conductors.

BACKGROUND OF THE INVENTION

Prior art fiber optic connectors have been provided for connecting optical fibers for transmitting light signals. Electrical connectors have also been provided for connecting electrical conductors to power electrically operated equipment. Such connectors have been used for connecting signal towers to switching stations for wireless telecommunication installations. The signal towers are often located at remote distances from telecommunication switching equipment and power connections, requiring that both signal conductors and power conductors be run between the signal tower and switching equipment. In the past, data connections were provided by electrical conductors, which usually were run separately from power conductors due to EMF interference concerns and shielding constraints. With an increase in the number or broadband wireless installations, more fiber optic cables have been installed for transmitting data signals between signal towers and switching equipment. The optical fibers of such cables have also been installed separately from electric power conductors, such that separate fiber optic connectors and electric power connectors were provided for connecting optical fibers and for connecting electric power conductors, respectively.

Fiber optic connectors have been provided by connectors having main bodies defined by metallic, outer sleeves. Inserts were mounted in forward ends of the outer sleeves for receiving termini assemblies, which were mounted to the terminal ends of respective optical fibers. One or more termini retainers were provided for securing the termini within the inserts. Alignment sleeves were provided for receiving the terminal ends of the termini of mating optical fibers being connected together, to align the optical fibers for transmitting light signals. Insert caps were secured to the outward ends of the inserts for securing alignment sleeves within the inserts. A rear seal body was secured in the rearward end of the outer sleeve. The rear seal body was fixedly mounted to the fiber optic cable being connected and was secured in the outer sleeve to secure the outer housing to the fiber optic connector in fixed relation to the cable. The rear seal body had a conically shaped profile for mating with a conically shaped member to retain a portion of an outer sheath or an armor of the fiber optic cable in a fixed relation between the conically shaped profiles. Seals were also provided for sealing between the forward end of the outer sleeve and the insert, and the rear seal body and the rearward end of the outer sleeve. The outer sleeve, the insert, the termini retainer, the insert cap and the rear seal body were typically formed of metallic components, with each piece being separately made and requiring assembly to provide and to service such connectors.

The outer sleeves of the above prior art connectors typically provided the structural members to which the insert bodies and insert caps were secured in the forward ends of the connectors, and to which the rear seal bodies were secured in the rearward ends of the connectors. This required that the outer sleeves be of certain wall thicknesses to provide structural integrity for maintaining the insert bodies and the rear seal bodies in fixed relation within the outer sleeve. The required minimum wall thicknesses for the outer sleeves were balanced against the desired maximum outside diameters of the fiber optic couplings and the interior diameter required for receiving the respective insert bodies and rear seal bodies, which are sized for receiving a desired number of optical fiber termini and a desired size of cable, respectively. The above constraints typically resulted in outer sleeve interior diameters which provide limited amounts of cross sectional areas, such that only a limited amount of slack may be provided in the portion of the optical fibers which extended between the inserts and the rear seal bodies due to constraints resulting from required minimum bend radiuses for the optical fibers. Since only nominal amounts of excess lengths of the optical fibers were provided within the outer sleeves of such connectors, usually all of the termini would have to be replaced when only one termini required replacement.

SUMMARY OF THE INVENTION

The present invention disclosed and claimed herein comprises, in one aspect thereof, a fiber optic connector for mounting to a cable having a plurality of optical fibers and optically connecting the optical fibers to mating optical fibers, wherein the optical fibers and the mating optical fibers have termini mounted to respective ends thereof. The fiber optic connector comprises a housing defining an exterior of the fiber optic connector and having a rear portion to which the cable is secured and through which the plurality of optical fibers enter the connector. A support member having a shank which is engaged with a retainer ring and which is disposed within the housing extends between the rear portion of the housing and a forward portion of the housing with a gap disposed between the housing and the shank through which the optical fibers extend. A recess is disposed in the forward portion of the housing and has an interiorly disposed periphery which defines a recess profile. The recess profile has inner portions which receive the termini of the optical fibers.

The present invention disclosed and claimed herein comprises, in another aspect thereof, a electrical connector for mounting to a cable having a plurality of electrical conductors and electrically connecting the electrical conductors to mating electrical conductors, wherein the electrical conductors and the mating electrical conductors have contacts mounted to respective ends thereof. The electrical connector comprises a housing defining an exterior of the electrical connector and having a rear portion to which the cable is secured and through which the plurality of electrical conductors enter the connector. A support member having a shank which is engaged with a retainer ring and which is disposed within the housing extends between the rear portion of the housing and a forward portion of the housing with a gap disposed between the housing and the shank through which the electrical conductors extend. A recess is disposed in the forward portion of the housing and has an interiorly disposed periphery which defines a recess profile. The recess profile has inner portions which receive the contacts of the electrical conductors.

The present invention disclosed and claimed herein comprises, in a further aspect thereof, a fiber optic connector for mounting to a cable having a plurality of optical fibers and optically connecting the optical fibers to mating optical fibers using termini. The fiber optic connector comprises a housing defining an exterior of the fiber optic connector. A forward portion of the housing defines a rear facing recess, and a rear portion of the housing allows entry of the optical fibers into the connector. A support member extends from the rear portion of the housing into the recess. The support member has a shank which extends between the recess and a rear portion of the support member. The shank is centrally disposed within the housing and defines an annular gap between the shank and the housing through which the optical fibers extend. The recess has a periphery which defines a recess profile, the recess profile having inner portions which receive the termini of the optical fibers.

BRIEF DESCRIPTION OF THE DRAWINGS

For a more complete understanding of the present invention and the advantages thereof, reference is now made to the following description taken in conjunction with the accompanying Drawings in which:

FIG. 1 is a forward end view of a hybrid connector for coupling both optical fibers and power conductors;

FIG. 2 is a longitudinal section view of the hybrid connector, taken along section line 2—2 of FIG. 1;

FIGS. 5A and 5B together provide an exploded, perspective view of the hybrid connector;

FIG. 6 is a longitudinal section view of a central support member of the hybrid connector, taken along section line 6—6 FIG. 5A;

FIG. 7 is an enlarged view perspective view of the forward end of the central support member, showing a retainer ring portion of the support member for securing optical fiber termini relative to the central support member;

FIG. 8 is a section view of the forward end of the central support member and the insert member, taken along section line 8—8 FIG. 5A;

FIG. 9 is a longitudinal section view of a termini for an optical fiber used in the hybrid connector;

FIGS. 10 and 11 are sectional views of alternative embodiments of the hybrid connector, showing various arrangements for the mating profiles of the retain ring and the insert.

DETAILED DESCRIPTION OF THE INVENTION

Figure 3:
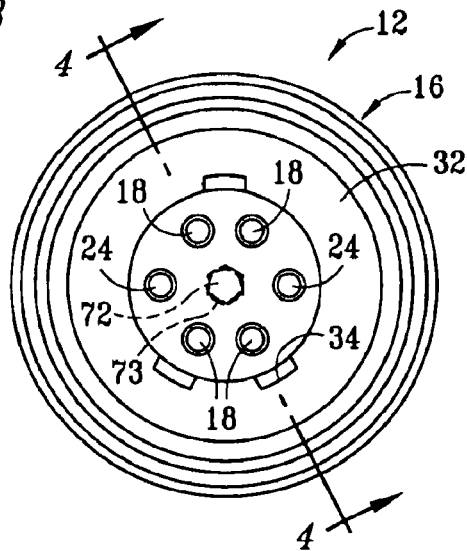
FIG. 3 is an end view of a hybrid receptacle for joining with the hybrid connector to connect mating pairs optical fibers and mating pairs of power conductors.
Figure 4:
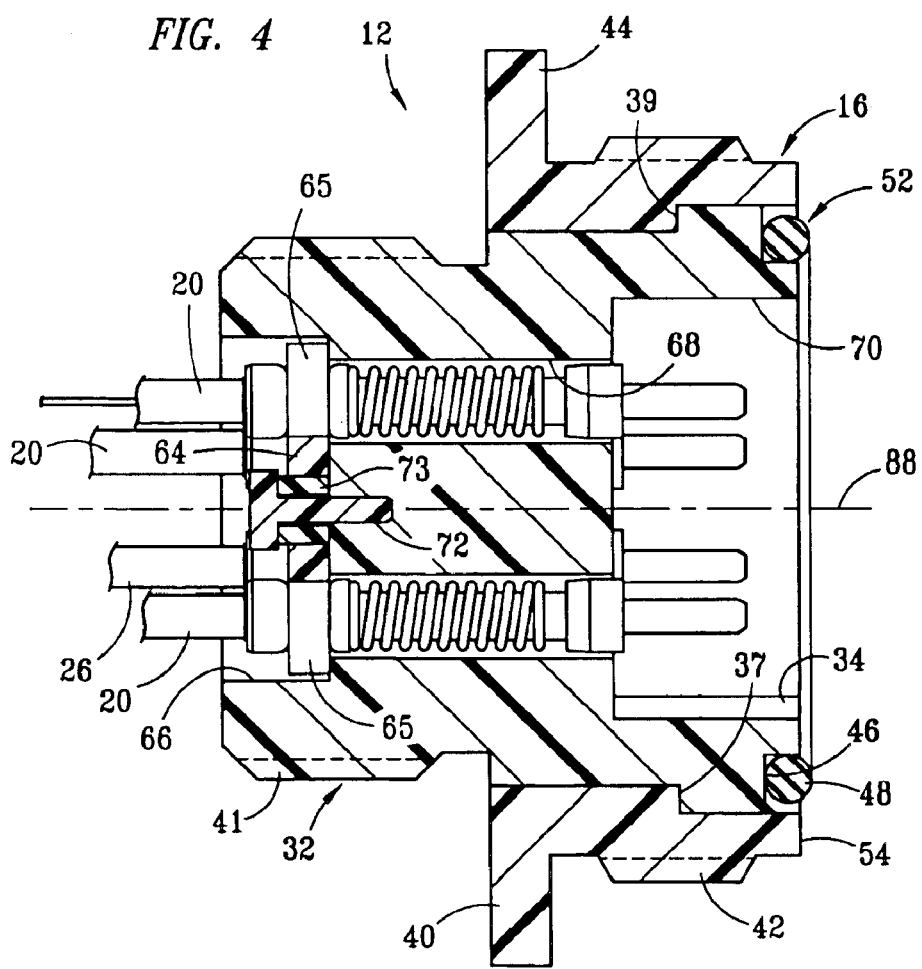
FIG. 4 is a sectional view of the hybrid receptacle, taken along section line 4—4 of FIG. 3.

FIGS. 1 through 4 are various views of a hybrid fiber optic and electric power cable coupling 12 having a hybrid connector 14 and hybrid receptacle 16. FIG. 1 is a forward end view of the hybrid connector 14 and FIG. 2 is a longitudinal section view of the hybrid connector 14, taken along section line 2—2 of FIG. 1. FIG. 3 is an end view of the hybrid receptacle 16, and FIG. 4 is a sectional view of the hybrid receptacle 16, taken along section line 4—4 of FIG. 3. The hybrid cable coupling 12 provides an electro-optic coupling for connecting both respective termini 18 of optical fibers 20 and contacts 22 and 24 of electric power conductors 26. The hybrid connector 14 includes an insert member 28 which is preferably integrally molded of a non-conductive plastic, and includes three tabs 30 which protrude radially outward from the forward end of the insert member.28. The hybrid receptacle 16 includes a receptacle body 32, which also is preferably molded of a non-conductive plastic, and has three grooves 34 which are formed therein in longitudinal directions in a keyed arrangement for receiving the tabs 30 of the insert member 28. The keyed arrangement provides angular alignment between the connector 14 and the receptacle 16 such that respective ones of the fiber optic termini 18, and the electrical contacts 22 and 24 will be aligned for coupling together.

A coupling nut 36 is rotatably mounted to the forward end of the hybrid connector 14 and has interior threads 38. As used herein, the terms forward and rearward are used in relation to the hybrid connector 14 and receptacle 16 in relation to a mating plane between mating termini, in which the forward end is closest to the mating plane and the rearward end would refer to the opposite, cable end of either the connector 14 or the receptacle 16. The coupling nut 36 is preferably formed of metal, but may also be formed of plastic. A coupling sleeve 40 is non-rotatably mounted to the exterior of the hybrid receptacle 16, and preferably has exterior threads 42 for securing to the interior threads 38 of the coupling nut 36 to secure the hybrid connector 14 to the receptacle 16. Preferably, the hybrid receptacle 16 includes a mounting flange 44. The coupling sleeve 40 preferably has an interiorly disposed, annular-shaped shoulder 37 which faces forward for engaging a rearwardly facing, annular-shaped shoulder 39 formed on the exterior of the receptacle body 32. The rearward end of the receptacle body 32 has threads 41, for securing a coupling nut (not shown) which retains the coupling sleeve 40 in fixed position relative to the receptacle body 32, pressed against the shoulder 39 of the receptacle body 32.

Referring to FIGS. 3 and 4, the forward face of the receptacle body 32 has a groove provided by an annular-shaped notch 46 formed therein for receiving a seal member 48. The seal member 48 is preferably an elastomeric O-ring. When the hybrid connector 14 and the hybrid receptacle 16 are coupled together, the forward face 50 of the forward housing 29 is spaced apart from and extends parallel to the notch 46 to define a seal gland 52, within which the seal member 48 is disposed for sealing therebetween. The forward end of the coupling sleeve 40 defines a shoulder 54 which presses against the forward face 50 of the forward housing 29 to define the width of the seal gland 52.

The hybrid receptacle 16 has a forward recess 70 formed in the forward end of the receptacle body 32, centrally disposed around the longitudinal axis 88. A plurality of bores 68 extend from the recess 70, through the receptacle body 32 and into a recess 66 formed in the rear face of the receptacle body 32. The recesses 70 and 66 are preferably coaxial with and concentrically disposed around the longitudinal axis 88. The bores 68 have central, longitudinal axes which are angularly spaced equal angular distances around, and which extended parallel to the central longitudinal axis 88 of the receptacle 16. A termini retainer 64 is provided having slots 65 which extend from the outer edge of the termini retainer 64 for receiving the bodies of the termini 18, to retain the termini 18 within the bores 68 in the retainer body 32. The termini retainer 64 is slidingly engaged within the recess 66, and has an outside diameter which is smaller than the interior diameter of the recess 66 to provide clearance such that the termini retainer may move slightly to allow the forward terminal ends of the termini 18 to move for aligning with mating termini in the hybrid connector 14. The termini retainer 64 is secured to the receptacle body 32 by a fastener 72, which is preferably threaded and fits within threaded hole formed into the receptacle body 32. A bushing 73 is secured to the receptacle body 32 by the fastener 72. The bushing 73 has a larger thickness than the width of the termini retainer 64, in a direction along the longitudinal axis 88, such that the termini retainer 64 may move slightly in a direction along the longitudinal axis 88 to allow some float for the termini 18 in the receptacle 16 to align with mating termini 18 in the hybrid connector 14.

The insert member 28 of the hybrid coupling 12 is Conned such that the alignment sleeves 56 are retained within the insert member 28, along with the termini 18. The connector 14 is mounted to a hybrid cable 58 by fixedly securing a rear seal body 60 to the cable 58. A centrally disposed support member 62 extends from the rear seal body 60, forward and into the insert member 28. The support member 62 provides a strut for structurally supporting and separating the rear seal body 60 from the insert member 28. The support member 62 provides a strut having a rear portion 74 with exterior threads for threadingly securing to the forward end of the rear seal body 60. An elongated shank 76 extends forward from the rear portion 74. A retainer ring 78 is disposed to extend around the shank 76, provided by an enlarged portion of the shank 76. A tab 80 extends from a forward terminal end of the shank 76 for being received within an alignment notch 86 of the insert member 28. The insert member 28 has a rear facing, recessed portion 84 for receiving the forward end of the shank 76 and the retainer ring 78. The termini 18 and the contacts 22 are secured by intermating portions of an edge of the retainer ring 78 and an interior surface of the recessed portion 84 of the insert member 28,which are discussed below in more detain in reference to FIG. 9. The hybrid connector 14 and the hybrid receptacle 16 have a longitudinal axis 88.

A retainer sleeve 92 is provided for retaining an outer jacketing of the cable 58 between the retainer sleeve 92 and the rear portion 74 of the support member 62. The jacketing of the cable 58 is preferably formed of an aramid fiber, such as KEVLAR™. The retainer sleeve 92 has an interior bore having an interior tapered portion 94 and a profile 96 which is hex-shaped for mating with an exterior tapered portion 100 and hex-shaped flats 98, respectively, of the rear portion 74 of the support member 62. The rear end of the rear portion 74 of support member 62 is tapered for mating against the interior taper 94 of the retainer sleeve 92, with the jacketing of the cable 58 retained therebetween to fixedly secure the cable 58 in fixed relation to the rear seal body 60. The support member 62 is threadingly secured into the rear seal body 60, to pull the tapered rear portion 74 of the support member 62 into the interior taper 94 of the retainer sleeve 92, wedging a jacketing of the cable 58 between the interior taper 94 and the tapered rear portion 74 of the support member 62 to secure the rear seal body 60 and the support member to the cable 58. The retainer sleeve 92 is secured within a socket 93 which provides and annular shaped shoulder 95 against which the retainer sleeve 92 is pressed b the rear, tapered terminal end of the support member 62. As shown, the retainer sleeve 92 is a separate member from the rear seal body 60, but in other embodiments, the retainer sleeve 92 may integrally formed as a single part which includes the rear seal body 60. The retainer sleeve 92 and the rear seal body 60, whether separate components or together formed as a singular piece, may be formed of metal or molded from plastic.

Figure 5A:
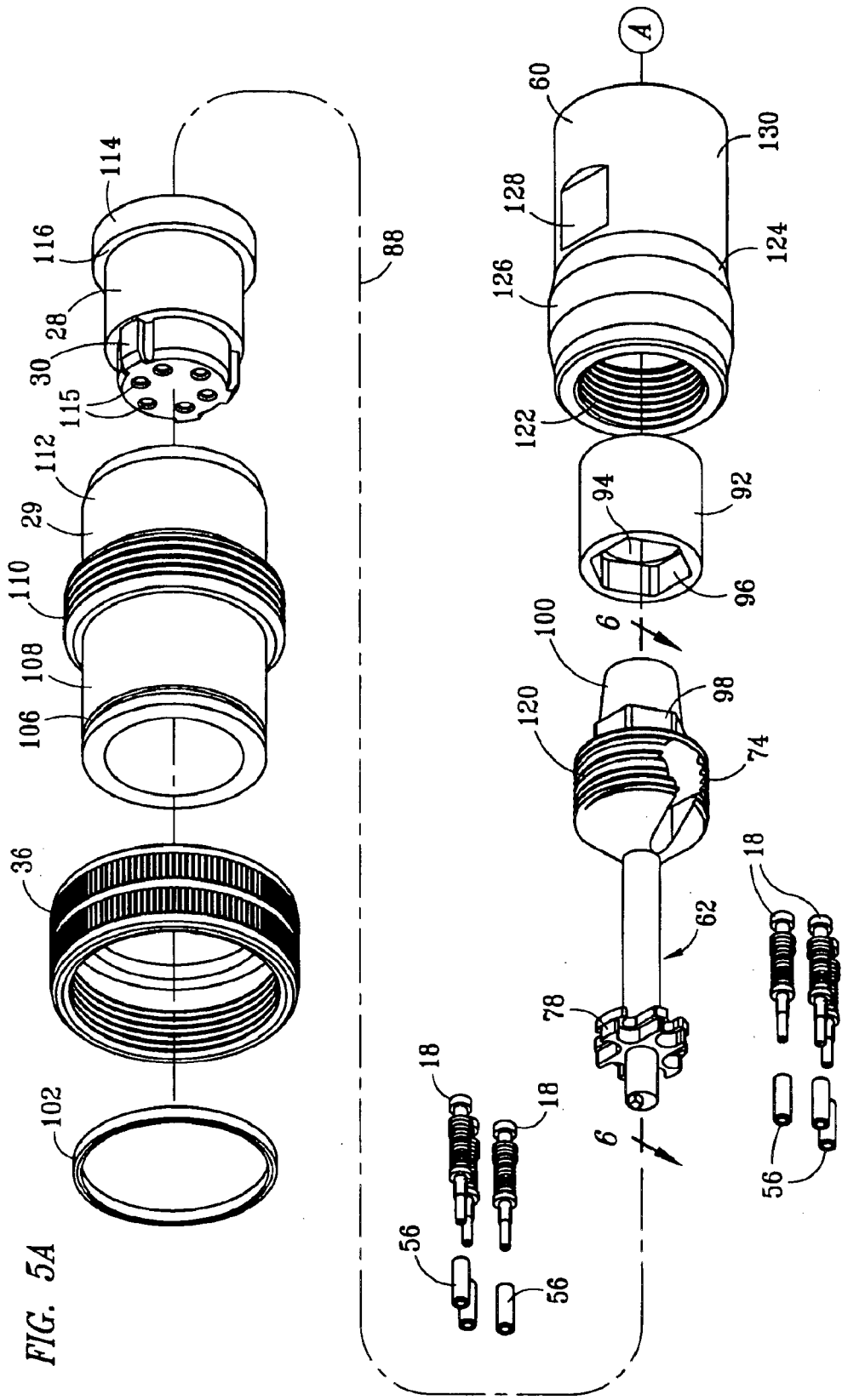

FIGS. 5A and 5B together provide an exploded view showing various components of the hybrid connector 14 in perspective. The hybrid connector 14 includes a retainer ring 102 for securing in a groove 106 of a forward end 108 of the forward housing 29. In FIG. 5A, the forward housing 29 is shown as a separate member, rather than being shown as an over-molding which is formed on the insert member 28. In other embodiments, the forward housing 29 may be a separate member from the insert member 28. The forward housing 29 has a threaded central portion 110 and a longitudinally extending, rearward end portion 112.

The insert member 28 includes the tabs 30 on the forward end thereof, apertures 115 for passing the termini 18 and contacts 24 of the hybrid receptacle 16 into the insert member 28. The insert member 28 further includes an enlarged portion 114 which defines an annular-shaped shoulder 116, which is continuous and faces forward for engaging with a continuous annular-shaped shoulder 118 (shown in FIG. 2) formed interiorly within the forward housing 29 for facing rearward to matingly engage with the shoulder 116 of the insert member 28. The two mating shoulders 116 and 118 matingly engage such that when assembled within the hybrid connector 14, the shoulder 118 will press against the shoulder 116 to secure the insert member 28 within the forward housing 29. The rear portion 74 of the support member 62 has exterior threads 120, for threadingly securing to the interior threads 122 of the enlarged portion 124 defining the forward end of the rear seal body 60. The exterior of the enlarged portion 124 has an outwardly disposed, annular-shaped seal surface 126. Two flats 128 (one shown in FIG. 5a) are provided for engaging with a wrench for threadingly securing the rear seal body 60 to the support member 62. The flats 128 are formed into the exterior of the rearward portion 130.

A seal boot 140, a compression ring 142, and two seal members 144 and 146 are provided for securing within a rear housing cap 156 of the hybrid connector 14. The seal members 144 and 146 are preferably provided by elastomeric O-rings which are disposed within the seal glands 148 and 150 (shown in FIG. 2). The seal glands 148 and 150 are defined by grooves 152 and 154, respectively, formed into the interior surface of the rear housing cap 156, and an exterior, rearward end portion 112 of the forward housing 29, and the seal surface 126 of the enlarged portion 124 of the rear seal body 60. The rear housing cap 156 has interior threads 158 formed into a forward end thereof. The rearward terminal end of a rearward portion 162 of the rear housing cap 156 has an inwardly extending, annular-shaped, flange 160 which provides a lip for retaining the forward end 164 of the seal boot 140 within the rear housing cap 156 and the rear seal body 60.

FIG. 6 is a longitudinal section view of the support member 62, taken along section line 6—6 of FIG. 5A. The support member 62 has a passage 172 which extends from the rear terminal end of the support member 62, to an intermediate portion thereof, which is proximate to the forward end of the rear portion 74, and adjacent to the rear end of the shank 76. Preferably, the passage 172 has three sections, a rear section 174 which extends forward from the rear terminal end of the support member and then divides into two sections 176 and 178 in a Y-type of configuration. This Y type of configuration provides two exit points with the apertures 180 and 182, such that a large enough cross-sectional area will be provided by the apertures 180 and 182 so that a smaller bore may be used to define the internal diameter of the passages 176 and 178. The rear passage 174 may have a larger internal diameter than the forward passages 176 and 178. The electrical conductors 26 and the optical fibers 20 are both passed through the passage 17, and wound around the shank 76. Wrapping the electrical conductors 26 and the optical fibers 20 about the shank 76 provides a minimum bend radius for the optical fibers and sufficient slack for both the optical fibers 20 and the electrical conductors 26 to allow for rebuilding of one of the termini 18 without requiring all of the termini 18 included within the hybrid connector 14 having to be rebuilt.

FIG. 7 is a partial, perspective view of a forward end portion of the support member 62. The tab 80 is shown in forward terminal end face of the shank 76. The retainer ring 78 is shown in more detail, having a rearward portion 190 and a forward portion 192. The rearward portion is of a slightly larger dimension around the entire peripheral edge of the rearward portion 190 than that of the forward portion 192, such that a shoulder 194 defines a lip which extends continuously around the peripheral edge of the retainer ring 78. This continuous shoulder 194 provides a stop for retaining the termini 18 within the insert member 28 (shown in FIG. 2). The peripheries of the edges of the rearward portion 190 and the forward portion 192 define profiles 196 and 198, respectively. The profiles 196 and 198 have outermost portions 200 and 201 for matingly engaging against the interior of the recess portion 84 of the insert member 28. The portions 202 and 203 of the profiles 196 and 198 are defined for engaging against the termini 18, with the lip or shoulder 194 retaining the termini 18 within the recessed portion 84 of the insert member 28.

FIG. 8 is a sectional view of the insert 28, and the shank 76 and retainer ring 78 of the support member 62, taken along section line 8—8 of FIG. 2 after the retainer ring 78 is inserted within the insert 28 to retain the termini 18 and the electrical contacts 22 within the insert 28. The inner surface of the recessed portion 84 of the insert 28 is shaped to define a profile 212 having a plurality of portions 214 and 216. The portions 214 of the profile 212 for matingly receive the portions 200 of the periphery 196 of the retainer ring 78. The portions of the profile 212 are arcuately shaped for being spaced apart from the portions 202 of the profiles 196 and 198 together define bores 220 within which the termini 18 are disposed. The profile 212 of the recess 84 is further formed to have a shape which provides an inwardly protruding member which defines keying members 218 which matingly engage the portions of the profiles 196 and 198 defined by the shape of the profiles 196 and 198 to angularly align the retainer ring 78 and shank 76 within the recess 84 of the insert member 28. That is, the general shape of the profile 212 is defined in relations to the general shape of the profiles 196 and 198 to provide a keying arrangement for angularly aligning the retainer ring 78 of the support member 62 to align contacts 22 and the termini 18 within particularly defined portions 216 of the insert member 28. The tab 80 (shown in FIG. 7) is offset to one side of the forward face of the shank 76 such that only particular ones of the portions 202 of the profiles 196 and 198 will be aligned with particular ones of the portions 216 of the profile 212. The profile 212 and the profiles 196 and 198 are sized to provide a clearance therebetween, to allow slight adjustment of the terminal 18 for aligning with mating termini. The length of that portion of the shank 76 of the support member 62 which extends forward of the shoulder 194 of the retainer ring 78 is of a length to allow the termini 18 to move for slight distances parallel to the longitudinal axis 88, being pushes forward by the spring 244 to provide means for alignment of the termini 18 with mating termini. However the overall length of the support member 62 is such that the shank 76 is compressed between the insert 28 and the real seal body 60, such that no clearances are provided for movement of the support member 62 after the hybrid connector is fully assembled.

FIG. 9 is a longitudinal section view of a terminus assembly 232, which may be used for the termini 18 in he hybrid connector 14 and in the hybrid receptacle 16. The terminus assembly 232 includes a ferrule 234, which is preferably formed of a ceramic material. A terminus body 236 is preferably formed of metal, and has enlarged end portion 238 having a socket 248 within which the ferrule 234 is press fit. A retainer ring 240 is press fit on the rear end of the terminus body 236. A spring retainer ring 242 is preferably annular-shaped and slidably fits around the exterior of the terminus body 236. A coil spring 244 extends around the body 236, between the enlarged end portion 238 of the body 236 and the spring retainer ring 242. The spring retainer ring 242 is disposed between the spring 244 and the retainer ring 240. A bore 246 extends frm the rear terminal end of the terminus body 236 to the socket 248. The socket 248 is formed in the forward end of the terminus body 236, and preferably has a slight taper for receiving the rear terminal end of the ferrule 2234, which is press fit into the socket 248. A guide taper 250 is provided in the rear terminal end of the ferrule 234 for guiding an optical fiber into the bore 252. The bore 252 extends through the ferrule 234, from the guide taper 250 to the forward end face 254 of the ferrule 234. The end face 254 is polished along with a terminal end of an optical fiber, and preferably an optical coupling gel is placed on the forward end for coupling to another termini.

The insert 28 and the forward housing 29 are preferably formed of a molded of plastic material. The coupling nut 36, the rear seal body 60, the support member 62, the retainer sleeve 92 and the rear housing cap 156 may also be formed of molded plastic. The insert 28 and the support member 62 are preferably formed of non-conductive plastic. The coupling nut 36, the forward housing 29 and the rear housing cap 156 are preferably formed of conductive plastic materials. Similarly, the receptacle body 32 and the termini retainer 64 are preferably formed of non-conductive plastic, and the coupling sleeve 40 is formed of a conductive plastic material. The fastener and the busing 73 may also be of plastic, either conductive or non-conductive. Preferably, polyphenalynesulfide ("PPS") is used to provide a plastic material for molding the various components of the connector 14 and the receptacle 16. The PPS is glass filled to provide the non-conductive plastic materials. For the conductive plastic materials, metallic particles are included in the PPS, which also may be glass filled. In other embodiments, various ones of the components of the connector 14 and the receptacle 16 may be formed of other suitable materials, such as metal.

Preferably, the hybrid connector 14 and the hybrid receptacle 16 of the coupling 12 may be used for selectively coupling only optical fibers 20 or for coupling only electrical conductors 26. In the preferred embodiment of the hybrid connector 14, each of the bores 86 the connector 14, the mating profiles 196 and 198 of the retainer ring 78 mounted to the shank 76 of the support member 62, and the recess 84 in the insert 28 are sized for receiving either of the termini 18 of optical fibers 18 or the contacts 22 of the electrical conductors 26. Similarly, in the preferred embodiment of the hybrid receptacle 16, each of the bores 68 in the receptacle body 32 and the slots 65 in the termini retainer 64 are sized for receiving either of the termini 18 of optical fibers 18 or the contacts 24 of the electrical conductors 26. Various ones of the optical termini 18 and the electric contacts 22 and 24 may be selectively field interchanged in the hybrid connector 14 and the hybrid receptacle 16, for selectively connecting either optical fibers 20 or electrical conductors 26. The connectors and mating receptacles (not shown) of FIGS. 10 and 11 may also be similarly field configured for selectively connecting optical fibers 20 or electrical conductors 26.

FIGS. 10 and 11 are sectional views similar to FIG. 8, which schematically depict alternative configurations for matingly engaging retainer rings of alternative central members within various insert members. In FIG. 10, an alternative insert 262 is engaged with an alternative retainer ring 264, having profiles 268 and 270 respectively. In FIG. 11, alternative insert 272 is an alternative retainer ring 274 have mating profiles 276 and 278, respectively.

Figure 12:
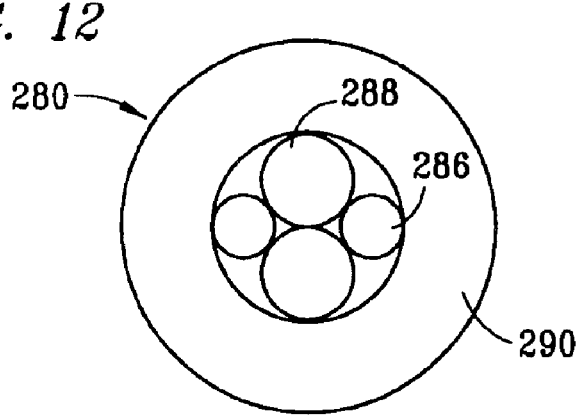
FIGS. 12 through 14 show various embodiments of hybrid fiber optic and power conductor cables for use with the hybrid connector.
Figure 13:
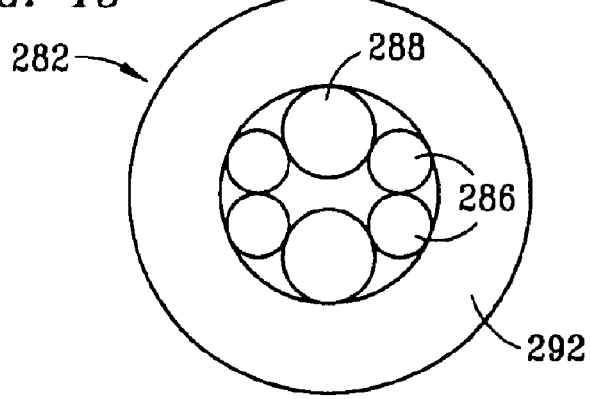
Figure 14:
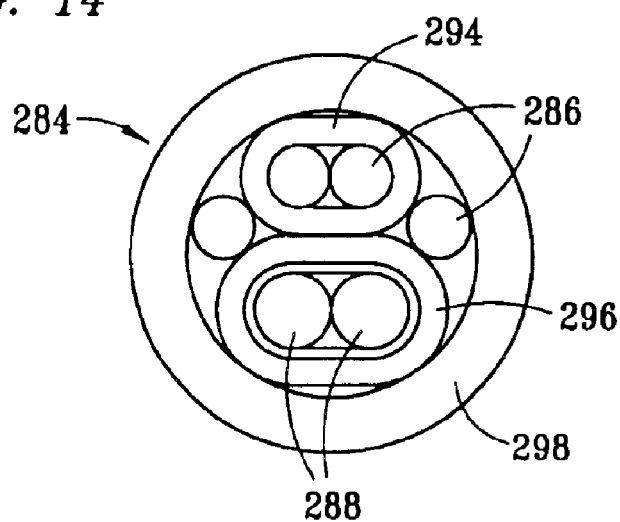

FIGS. 12, 13 and 14 are sectional views which schematically depict various alternative configurations for alternative hybrid cables 280, 282 arid 284, respectively. The hybrid cables 280, 282 and 284 include various combinations and structures for enclosing housing optical fibers 286 and electric power conductors 288. The hybrid cables 280 and 282 have outerjackets 290 and 292, respectively. The hybrid cable 284 has an outerjacket 298, and innerjackets 294 and 296 disposed interiorly within the outer jacket 298.

The hybrid connector of the present invention provides several advantages over prior art fiber optic connectors and electrical connectors. A singular connector is provided for connecting both electrical conductors and optical fibers, for providing electrical power and carrying optical data signals, respectively. A support member is provided which is centrally disposed within the hybrid connector, providing a strut of elongated shape which provides structural support for the hybrid connector, extending between an insert member in the forward end of the hybrid connector and a rear seal body disposed in the rearward end of the hybrid connector. The strut member has a retainer ring which is integrally molded therewith, and formed to have a edge periphery for matingly engaging within an interior periphery of a recess formed in the rearward end of the insert member. The outer periphery of the retainer member and the interior periphery of the recess of the insert for shaped to together define sockets or seats for receiving the termini and the electrical contacts, and define continuous shoulders for retaining the termini in fixed relation between the retainer ring of the support member and the insert body. The hybrid connector has several components which are integrally molded from plastic to reduce production costs and labor required for assembly. The insert and insert cap are integrally molded as a singular members, and the termini retainer and the support member are integrally molded as singular members. Additionally, a portion of the housing is over-molded onto the insert, reducing the number parts required for the hybrid connector 14.

Although the preferred embodiment has been described in detail, it should be understood that various changes, substitutions and alterations can be made therein without departing from the spirit and scope of the invention as defined by the appended claims.

What is claimed is:

1. A fiber optic connector for mounting to a cable having a plurality of optical fibers and optically connecting the optical fibers to mating optical fibers, wherein the optical fibers and the mating optical fibers have termini mounted to respective ends thereof, the fiber optic connector comprising:

a housing defining an exterior of the fiber optic connector and having a forward portion and a rear portion to which the cable is secured and through which the plurality of optical fibers enter the connector;

a support member having a shank which is disposed within the housing extending between the rear portion of the housing and the forward portion of the housing with a gap disposed between the housing and the shank through which the optical fibers extend;

a recess which is disposed in the forward portion of the housing and has an interiorly disposed periphery which defines a recess profile, the recess profile having inner portions which receive the termini of the optical fibers;

a retainer ring disposed on the shank of the support member in the forward portion of the housing such that the retainer ring is positioned within the recess;

the retainer ring further including an edge periphery which defines a retainer profile having outward portions and inward portions, the inward portions being defined for receiving the termini of the optical fibers; and wherein the recess profile and the retainer profile are formed such that the retainer profile fits within the recess profile in a keyed arrangement, thereby angularly aligning the retainer ring with the recess.

2. The fiber optic connector in accordance with claim 1, further including electrical contacts for mounting to electrical conductors included in the cable and extending through the gap between the housing and the shank.

3. The fiber optic connector in accordance with claim 1, wherein the shank is dimensioned to allow the optical fibers to wrap around the shank with a bend radius which is not less than the predetermined minimum bend radius for the optical fibers.

4. The fiber optic connector in accordance with claim 1, wherein the gap between the housing and the shank is dimensioned to allow the optical fibers to wrap around the shank with sufficient slack between the cable and the termini to allow for rebuilding one of the termini without requiring all of the termini within the connector to be rebuilt.

5. The fiber optic connector in accordance with claim 4, further including electrical contacts for mounting to electrical conductors included in the cable and extending through the gap between the housing and the shank, the conductors wrapping around the shank with the optical fibers with sufficient slack between the cable and the contacts to allow for rebuilding one of the contacts and termini without requiring all of the contacts and termini within the connector to be rebuilt.

6. An electrical connector for mounting to a cable having a plurality of electrical conductors and electrically connecting the electrical conductors to mating electrical conductors, wherein the electrical conductors and the mating electrical conductors have contacts mounted to respective ends thereof, the electrical connector comprising:

a housing defining an exterior of the electrical connector and having a forward portion and a rear portion to which the cable is secured and through which the plurality of electrical conductors enter the connector;

a support member having a shank which is disposed within the housing extending between the rear portion of the housing and the forward portion of the housing with a gap disposed between the housing and the shank through which the electrical conductors extend;

a recess which is disposed in the forward portion of the housing and has an interiorly disposed periphery which defines a recess profile, the recess profile having inner portions which receive the contacts of the electrical conductors;

a retainer ring disposed on the shank of the support member in the forward portion of the housing such that the retainer ring is positioned within the recess;

the retainer ring further includes an edge periphery which defines a retainer profile having outward portions and inward portions, the inward portions being defined for receiving the contacts of the electrical conductors; and wherein the recess profile and the retainer profile are formed such that the retainer profile fits within the recess profile in a keyed arrangement, thereby angularly aligning the retainer ring with the recess.

7. The electrical connector in accordance with claim 6, further including termini for mounting to optical fibers included in the cable and extending through the gap between the housing and the shank.

8. The electrical connector in accordance with claim 6, wherein the gap between the housing and the shank is dimensioned to allow the electrical conductors to wrap around the shank with sufficient slack between the cable and the contacts to allow for rebuilding one of the contacts without requiring all of the contacts within the connector to be rebuilt.

9. The electrical connector in accordance with claim 8, further including termini for mounting to optical fibers included in the cable and extending through the gap between the housing and the shank, the optical fibers wrapping around the shank with the electrical conductors with sufficient slack between the cable and the termini to allow for rebuilding one of the contacts and termini without requiring all of the contacts and termini within the connector to be rebuilt.

* * * * *